United States Patent
Mihaila et al.

(10) Patent No.: US 8,392,402 B2
(45) Date of Patent: Mar. 5, 2013

(54) HYBRID PUSH/PULL EXECUTION OF CONTINUOUS SQL QUERIES

(75) Inventors: George Andrei Mihaila, Yorktown Heights, NY (US); Ioana Roxana Stanoi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/327,214

(22) Filed: Dec. 3, 2008

(65) Prior Publication Data

US 2010/0138405 A1    Jun. 3, 2010

(51) Int. Cl.
    *G06F 7/00*    (2006.01)
(52) U.S. Cl. ........................................... 707/718
(58) Field of Classification Search .................. 707/718, 707/764, 999.003
    See application file for complete search history.

(56) References Cited

U.S. PATENT DOCUMENTS

| | | | |
|---|---|---|---|
| 5,495,600 A | 2/1996 | Terry et al. | |
| 5,680,602 A | 10/1997 | Bloem et al. | |
| 5,920,857 A * | 7/1999 | Rishe et al. | 1/1 |
| 6,496,831 B1 | 12/2002 | Baulier et al. | |
| 6,625,593 B1 * | 9/2003 | Leung et al. | 1/1 |
| 7,162,472 B2 | 1/2007 | Galindo-Legaria et al. | |
| 7,194,451 B2 * | 3/2007 | Chaudhuri et al. | 707/694 |
| 7,925,665 B2 * | 4/2011 | Schneider et al. | 707/774 |
| 2004/0133567 A1 * | 7/2004 | Witkowski et al. | 707/3 |
| 2007/0043803 A1 * | 2/2007 | Whitehouse et al. | 709/201 |
| 2008/0109452 A1 * | 5/2008 | Patterson | 707/10 |
| 2009/0248618 A1 * | 10/2009 | Carlson et al. | 707/2 |
| 2010/0017380 A1 * | 1/2010 | Naibo et al. | 707/4 |
| 2010/0106636 A1 * | 4/2010 | Lutnick et al. | 705/37 |
| 2010/0223283 A1 * | 9/2010 | Lee et al. | 707/769 |

* cited by examiner

*Primary Examiner* — Kimberly Wilson
*Assistant Examiner* — Mohammed R Uddin
(74) *Attorney, Agent, or Firm* — Yee & Associates, P.C.; Preston Young

(57) ABSTRACT

Illustrative embodiments provide a computer-implemented method for hybrid push/pull of continuous structured query language queries. The computer-implemented method receives stream input, wherein the stream input comprises events of interest, builds and a state machine and stream plans, based on an original query, and replicates the stream input. Responsive to a push sub-query trigger, the computer-implemented method submits a pull sub-query to the database to produce a result, and sends the result to a requester.

14 Claims, 6 Drawing Sheets

HYBRID PUSH/PULL EXECUTION OF CONTINUOUS SQL QUERIES

BACKGROUND OF THE INVENTION

1. Field of the Invention

The present invention relates generally to an improved data processing system and, more specifically, to a computer-implemented method, a data processing system, and a computer program product for hybrid push/pull of continuous structured query language (SQL) queries.

2. Description of the Related Art

Event monitoring systems are used in various business domains, such as health care, business process monitoring, financial applications, and environment protection, to name a few. Event monitoring systems are based on the notion of continuous queries, which seek patterns of events occurring in a particular time sequence and usually within a user-specified time interval. For example, a continuous query in the financial domain would monitor for a condition of a rapid decline in a stock price of a company by some predetermined amount within a defined time span, followed by another similar decline no later than some predefined number of hours after the initial decline was observed.

Existing systems evaluate continuous queries using either a data push or data pull strategy. In the data push, or eager evaluation strategy, a stream processing engine uses main memory resident state automata to process each incoming event as the event arrives. The advantage of this method is that the method can notify the user as soon a match between the event and predetermined criteria are found. The drawback, however, is that the amount of state information that can be maintained is limited by the available memory.

To overcome this limitation, a data pull, or lazy evaluation strategy is implemented. The data pull strategy consists of storing all incoming events in a data base management system (DBMS) and simulating the continuous query by periodically querying the data base management system. An important factor involves determining when the queries to the data base management system should be triggered. Overloading the data base management system is not practical. When queries are submitted too often, especially since most of the time they will not produce new results, an overload occurs.

On the other hand, if queries are sent infrequently, the user may be notified of an interesting event pattern too late to respond. A need therefore exists to determine when such queries are most likely to produce new results.

BRIEF SUMMARY OF THE INVENTION

According to one embodiment of the present invention, a computer-implemented method for hybrid push/pull of continuous structured query language queries is provided. The computer-implemented method receives stream input, wherein the stream input contains events of interest, builds stream plans based on an original query and a state machine, and replicates the stream input. Responsive to a push sub-query trigger, the computer-implemented method submits a pull sub-query to the database to produce a result, and sends the result to a requester.

According to another embodiment, a data processing system for hybrid push/pull of continuous structured query language queries is presented. The data processing system comprises a bus, a memory connected to the bus, wherein the memory comprises computer executable instructions, a communication unit connected to the bus, a database connected to the bus, a processor unit connected to the bus. The processor unit executes the computer executable instructions to direct the data processing system to receive stream input, wherein the stream input contains events of interest, build stream plans based on an original query and a state machine, replicate the stream input, responsive to a push sub-query trigger, submit a pull sub-query to the database to produce a result, and send the result to a requester.

In another embodiment, a computer-program product for hybrid push/pull of continuous structured query language queries is provided. The computer program product comprises a computer usable medium having computer executable instructions stored thereon. The computer executable instructions comprising, computer executable instructions for receiving stream input, wherein the stream input comprises events of interest, computer executable instructions for building stream plans based on an original query and a state machine, computer executable instructions for replicating the stream input, computer executable instructions responsive to a push sub-query trigger, for submitting a pull sub-query to a database to produce a result, and computer executable instructions for sending the result to a requester.

DETAILED DESCRIPTION OF THE INVENTION

Figure 1:
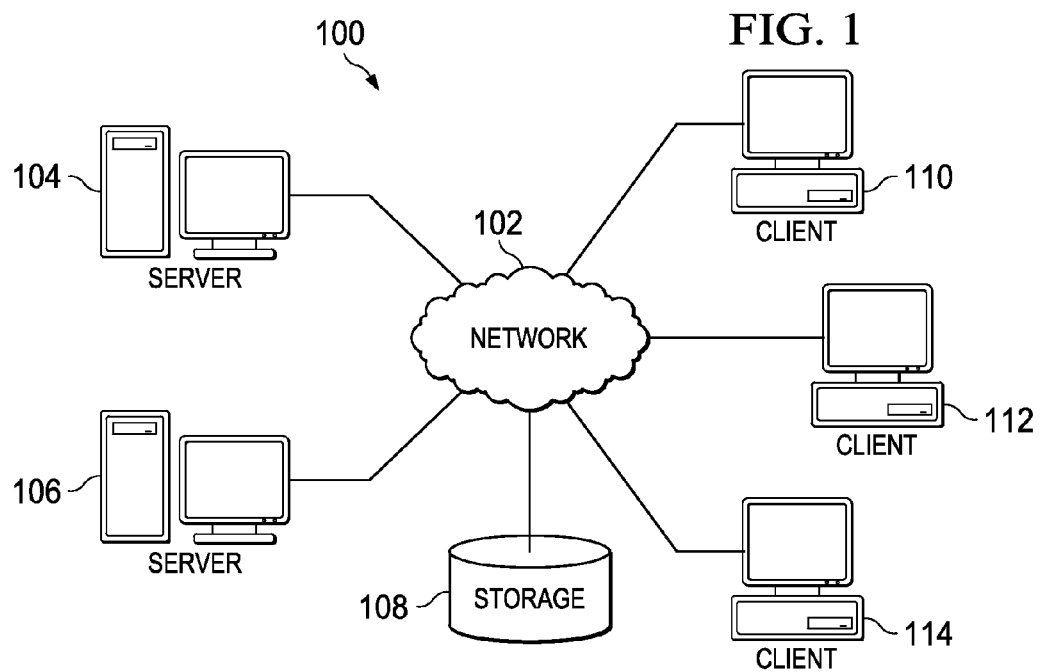
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 2:
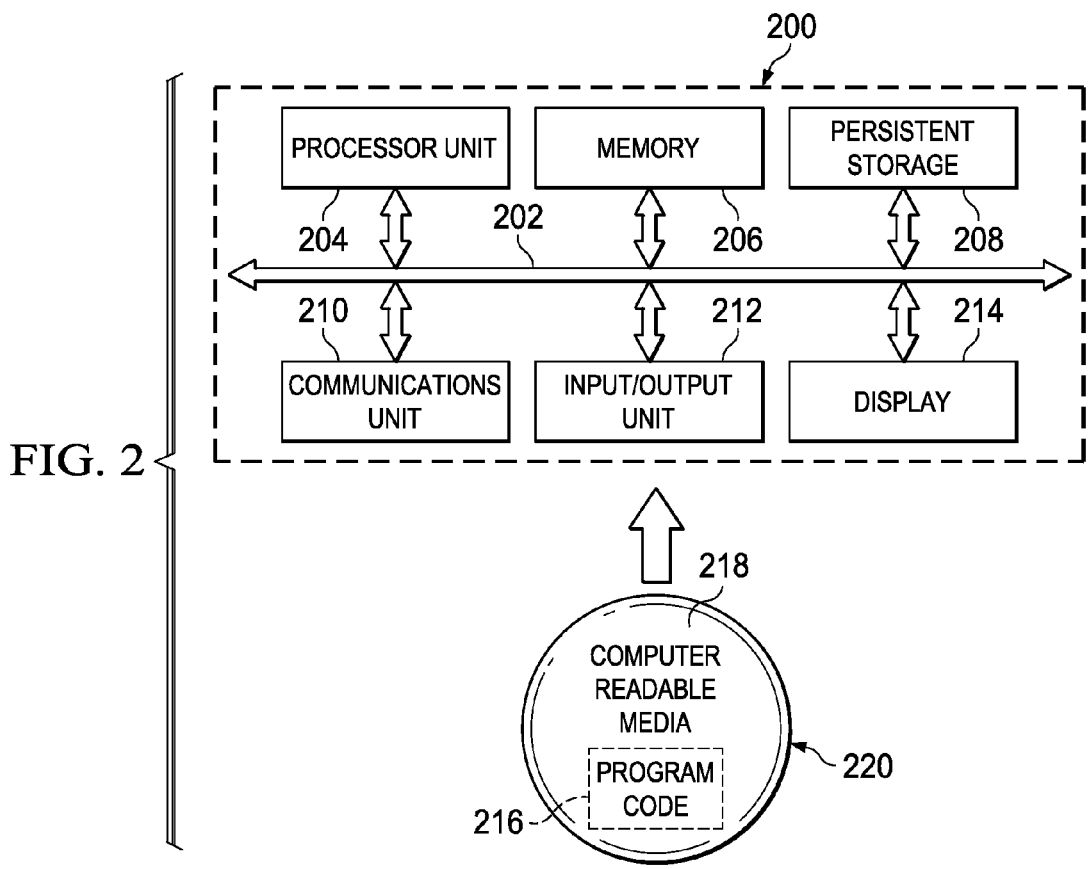
FIG. 2 is a block diagram of a data processing system in which illustrative embodiments may be implemented.

With reference now to the figures, and in particular to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer-recordable storage medium and downloaded to a data processing system or other device for use. For example, program code may be stored on a computer-recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to system 100 of FIG. 1, illustrative embodiments provide a capability for triggering the execution of a continuous query over event data stored in a relational data base management system located on server 104, by a client 110 over network 102. For example, the frequency of query invocation is minimized while the latency of delivering new results is within an acceptable user-defined bound. Illustrative embodiments provide a capability to extract a triggering pattern from the original continuous query. The triggering pattern is both efficiently computable on the fly and effective in limiting the frequency of execution of the original query over the data base management system on server 104. The triggering pattern identifies a match every time the incoming events match the original query of the triggering pattern. When the triggering pattern matches the incoming event, the query is executed in time to notify the user on client 110 that a match has occurred.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components, excluding a human being. For example, a storage device may be comprised of an organic semiconductor. As another example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

Figure 3:
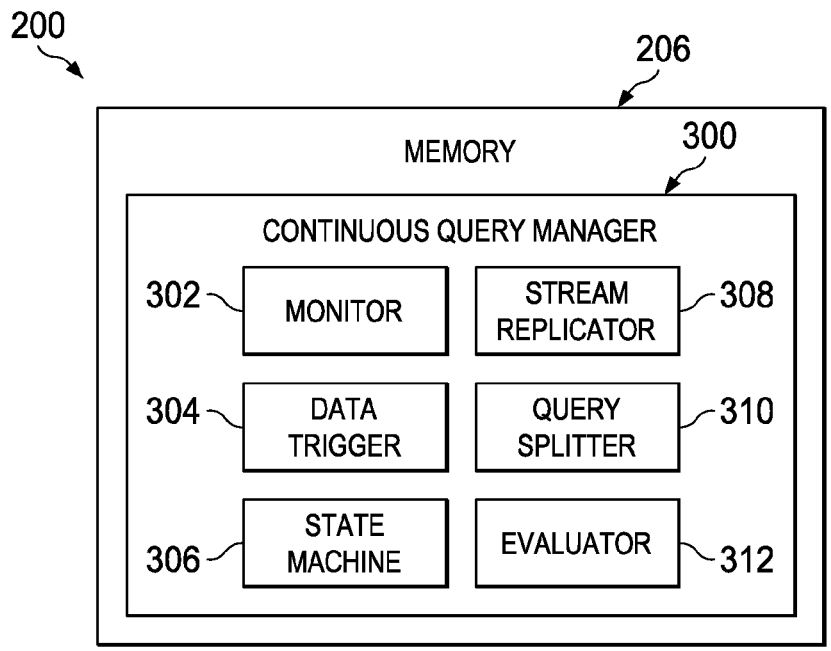
FIG. 3 is a block diagram of a continuous query manager, in accordance with illustrative embodiments.

With reference to FIG. 3, a block diagram of a continuous query manager, in accordance with illustrative embodiments, is presented. Continuous query manager 300 is shown within memory 206 of system 200 of FIG. 2. Continuous query manager 300 may also be located in other memory locations, such as storage 108 of system 100 of FIG. 1, until ready for use. Continuous query manager 300 may also be available as program code 216 of FIG. 2, until the program code is ready to be installed.

Continuous query manager 300 contains a number of integrated components that may be implemented as a set of modules or components in loose manner to be called as needed or more closely as a monolithic structure. Implementations may differ while providing the same level of function.

Monitor 302 provides a capability to monitor or track a stream of data for a particular pattern of interest. Monitor is capable of determining existence of a match between a source and target stream portion.

Data trigger 304 represents a specific pattern of data used to signal an event or operation. Data trigger 304 is a condition, which when met, leads to a defined action being fired.

State machine 306 provides a capability to track the state of the process. For example, state machine 306 is used to track when the process is in one of a push state and a pull state. Which specific action is taken may depend upon which state is in effect at the time. Moving from one state to another may be a selected course of action as well.

Stream replicator 308 provides a capability to copy portions of the stream for processing. The input stream may be copied or replicated for use by a stream processing engine, while allowing the stream input to be directed to the database as usual.

Query splitter 310 provides a capability to split a query into a portion that may be referred to as a push sub-query and a pull sub-query. A push sub-query is associated with the stream process while a pull sub-query is associated with a database management system process.

Evaluator 312 provides a capability to evaluate the cost of a function. For example, a function that reads many records over a long interval typically evaluates to a larger cost than a function involving fewer records over a shorter interval of time. Evaluator 312 typically uses costing based on attribute selectivity, join selectivity and data access cost.

Figure 4:
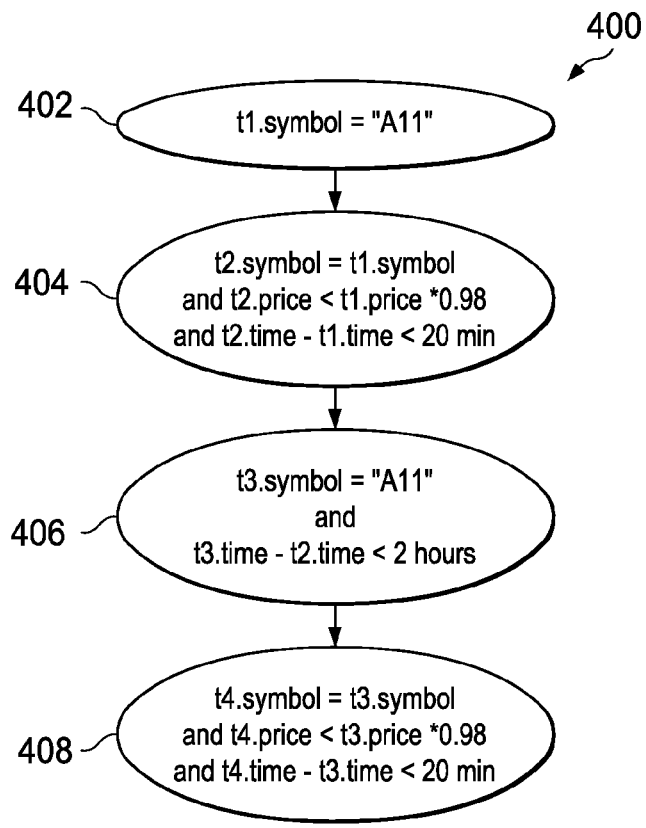
FIG. 4 is a block diagram of a continuous query in a financial monitoring domain.

With reference to FIG. 4, a block diagram of a continuous query in a financial monitoring domain is presented. In the example of a typical financial monitoring system, element 402 indicates the time period as "t1," a financial company represented by a stock symbol "A11" is to be monitored.

In element 404, time period is now "t2" and the stock symbol remains the same, as indicated by "t1.symbol." A further condition is specified as "t2.price <t1.price*0.98" representing a price in time "t2" must be less than 98 percent of the "t1" price, or a 2 percent drop. Further is added the price drop must occur within a duration specified as "t2.time−t1.time<20 min" meaning the duration is less than 20 from time "t1."

Moving to element 406, the stock symbol is the same as in time "t1" and the duration is now measured with respect to time "t2" as "t3.time−t2.time<2 hours."

With reference to element 408, time period is now "t4" and the stock symbol remains the same, as indicated by "t4.symbol=t3.symbol." A further condition is specified as "t4.price<t3.price*0.98" representing a price in time "t4" must be less than 98 percent of the "t3" price, or a 2 percent drop. Further a condition is added in which the price drop must occur within a duration specified as "t4.time−t3.time<20 min" meaning the duration is less than 20 from time "t3."

Figure 5:
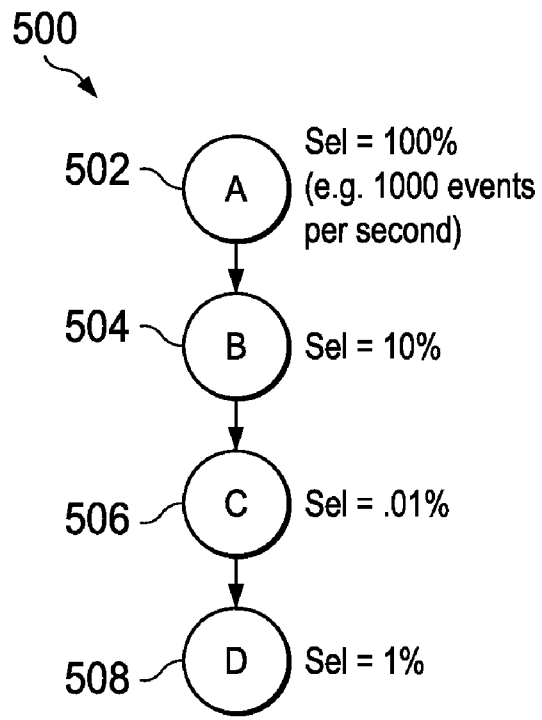
FIG. 5 is a block diagram of an abstraction of a continuous query in which each node represents a different condition within the event stream.

With reference to FIG. 5, a block diagram of an abstraction of a continuous query in which each node represents a different condition within the event stream is presented. The example of continuous query 500 provides an indication of which sub-queries may be suited for push versus pull operations. Each condition represented as elements 502-508 has an associated selectivity. The selectivity represents the percentage of events in a stream that will satisfy the condition. Selectivity may vary greatly among conditions in the stream being analyzed.

For example, element 502 has an associated selectivity of 100 percent. This may mean for a monitored stream in which 1000 events per second occur, all events would be used. Element 504 indicates a reduced selectivity of just 10 percent, while element 506 has an even more reduced selectivity of only 0.01 percent. Element 508 indicates a selectivity of 1 percent.

Typically, a candidate for a push sub-query would be element 506 because this condition is satisfied least with respect to the other conditions specified. Therefore, pull candidates would be best represented by elements 502, 504 and 508. From the example, an approach of stream splitting and sub-query building may be seen as an effective way to minimize database queries until necessary by executing pull sub-queries based on the successful occurrence of a push sub-query result.

Figure 6:
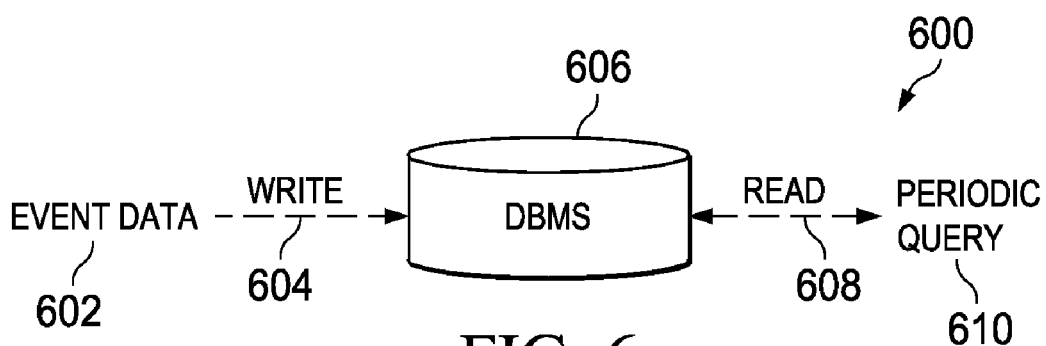
FIG. 6 is a block diagram of a processing system for continuous queries using a database management system.

With reference to FIG. 6, a block diagram of a processing system for continuous queries using a database management system as is currently implemented is shown. Process 600 depicts the current approach to processing continuous queries through a database management system. Input stream with event data 602, comprising event data, is provided by an input method causing write 604 to place the data of input stream 602 into database management system (DBMS) 606.

Periodic query 610 is executed against the accumulated data in database management system 606, causing a read 608 operation to occur. The frequency of querying the database is based on the data arrival rate, the size of the stored data, and the selectivity desired. Overhead caused by the query complexity and frequency is also a factor in determining the impact of the workload on the responsiveness of database management system 606.

Figure 7:
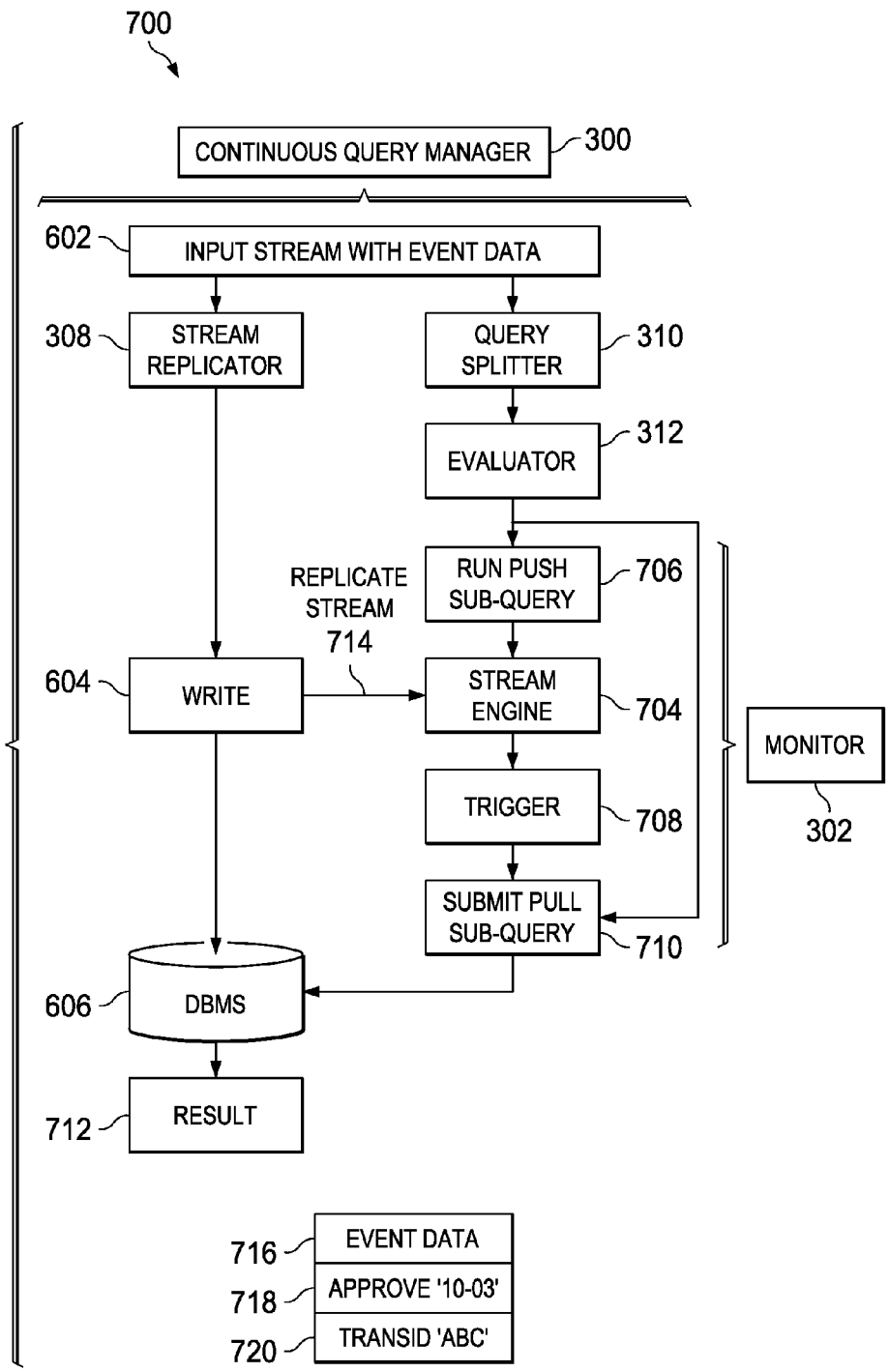
FIG. 7 is a block diagram of a processing system for hybrid continuous queries using a database management system, in accordance with illustrative embodiments.

With reference to FIG. 7, a block diagram of a processing system for hybrid continuous queries using a database management system, in accordance with illustrative embodiments, is presented. In processing system 700, components of continuous query manager 300 of FIG. 3 are presented in a data flow relationship. Components of continuous query manager 300 are marked with asterisk. Input stream with event data 602, of FIG. 6, comprising event data, is now processed into two portions rather than one stream as before by stream replicator 308. The input stream with event data 602 is now replicated in write 604 to direct one portion to database management system (DBMS) 606 while another portion, replicated stream 714 is directed to a state machine of stream engine 704.

Stream engine 704 provides a capability to run push sub-query 706 on the portion of replicated stream 714. Trigger 708 occurs when a pattern match occurs between an event in replicated stream 714 and a push sub-query 706. Trigger 708 is representative of data trigger 304 of FIG. 3. The match causes submit pull sub-query 710 to execute against the accumulated data in database management system 606. Execution of pull sub-query 710 creates results 712, which is then passed to a requester of the query. Monitor 302 provides an indication to execute trigger 708 as a result of execution of push sub-query 706.

The single query stream involving only a pull query has thus been replaced by a hybrid query combining push sub-queries and pull sub-queries. Query splitter 310 in combination with evaluator 312 provides analysis of original query from input stream 602 to create split queries. An original query is thus split into a smaller lightweight push sub query and a more complex pull sub-query. The smaller push sub-query does not affect the operation of the database management system as would a full pull sub-query operation. Therefore, the use of the push sub-query provides a relatively effective monitor of input stream 602 data.

Event data 716 comprises events of interest. The events provide a key or search argument for a query. For example, event 718 defines an approval type of event with a value of "10-03." IN another example, event 720 defines a transaction related event described by "transid" with a value of "ABC." Event descriptors as shown can be used to form a search argument or pattern. For example, a push sub-query may detect a match on "transid."

Figure 8:
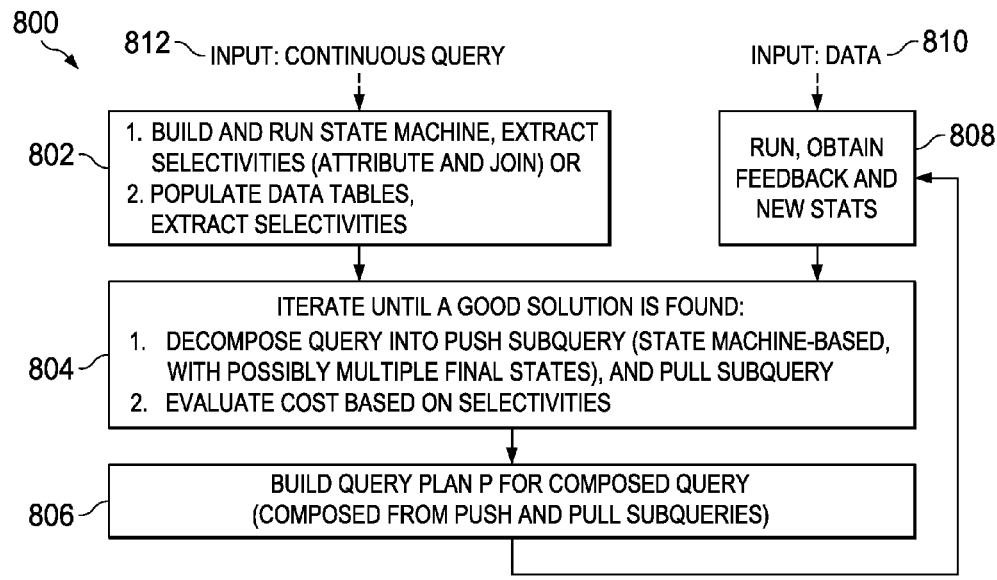
FIG. 8 is a block diagram of a query optimization process for hybrid continuous queries, in accordance with illustrative embodiments.

With reference to FIG. 8, a block diagram of a query optimization process for hybrid continuous queries, in accordance with illustrative embodiments, is presented. Query optimization process 800 may be seen as an iterative approach to refining the hybrid query based on estimated execution costs of various plans.

Input in the form of a continuous query 812 is provided to a first step 802. In step 802, the building and running of a state machine for extraction of selectivities, including attributes and join conditions, is performed. The selectivities indicate the frequency of an event pattern within the part. When a state machine already exists, population of data tables and extraction of selectivities may be performed as an alternative operation.

Using the extracted selectivities from step 802, step 804 iterates until a good solution is found. Estimates of the decomposition are used to determine the relevance and the cost. Iterate through a number of queries to find a low cost solution is the mechanism used. For example, decompose the continuous query into push sub-query that may be state machine-based with multiple possible final states and a pull sub-query. Evaluate the cost of this approach based on selectivities. Iterate through the process with other choices to derive a low-cost solution.

Having established a push sub-query and a pull sub-query (or many pull sub-queries) in step 804, combine the push and pull queries into a hybrid composed query "P" in step 806. The composed queries comprise both push and pull sub-queries that may be executed to determine a cost estimate and whether the results are satisfactory. The semantics of the original query should be retained to provide the results expected. When the results meet predefined criteria, the hybrid solution may be deployed for use.

Having executed the one or more composed queries, results are evaluated according to user criteria in optional step 808. Feedback may be obtained from the test result analysis to drive new iterations in step 804 as before. Further data may be added as input data 810 to aid in the tuning of the sub-queries of the composed query.

Figure 9:
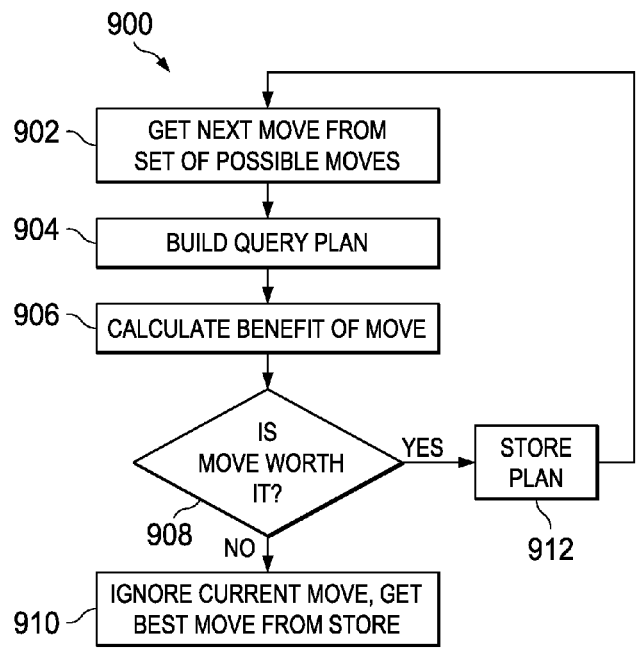
FIG. 9 is a block diagram of a process for determining space of possible query plans, in accordance with illustrative embodiments.

With reference to FIG. 9, a block diagram of a process for determining space of possible query plans, in accordance with illustrative embodiments, is presented. The "move" being examined is the move from solution to solution. Solutions may be analyzed, refined and saved in a "store" for later use as required. Step 902 obtains a next move from a set of possible moves. Moves may be kept in a repository of moves for use at a later time as saved queries.

From a selected move, a query plan is built in step 904. The query plan is then analyzed and a benefit of the move is calculated in step 906.

A determination is made as to whether the benefit of the move is worth the cost of the move in step 908. When a benefit is determined to be worth the cost, a "yes" results and the query plan is stored in step 912. Process 900 returns to step 902 for further move analysis.

When a benefit is determined not to be worth the cost, a "no" results in step 908. When a "no" is obtained in step 908, ignore the current move and get the best move from the store as step 910. The current solution is then dropped and a previous solution of predetermined low cost is selected from the store or repository, such as a database.

Figure 10:
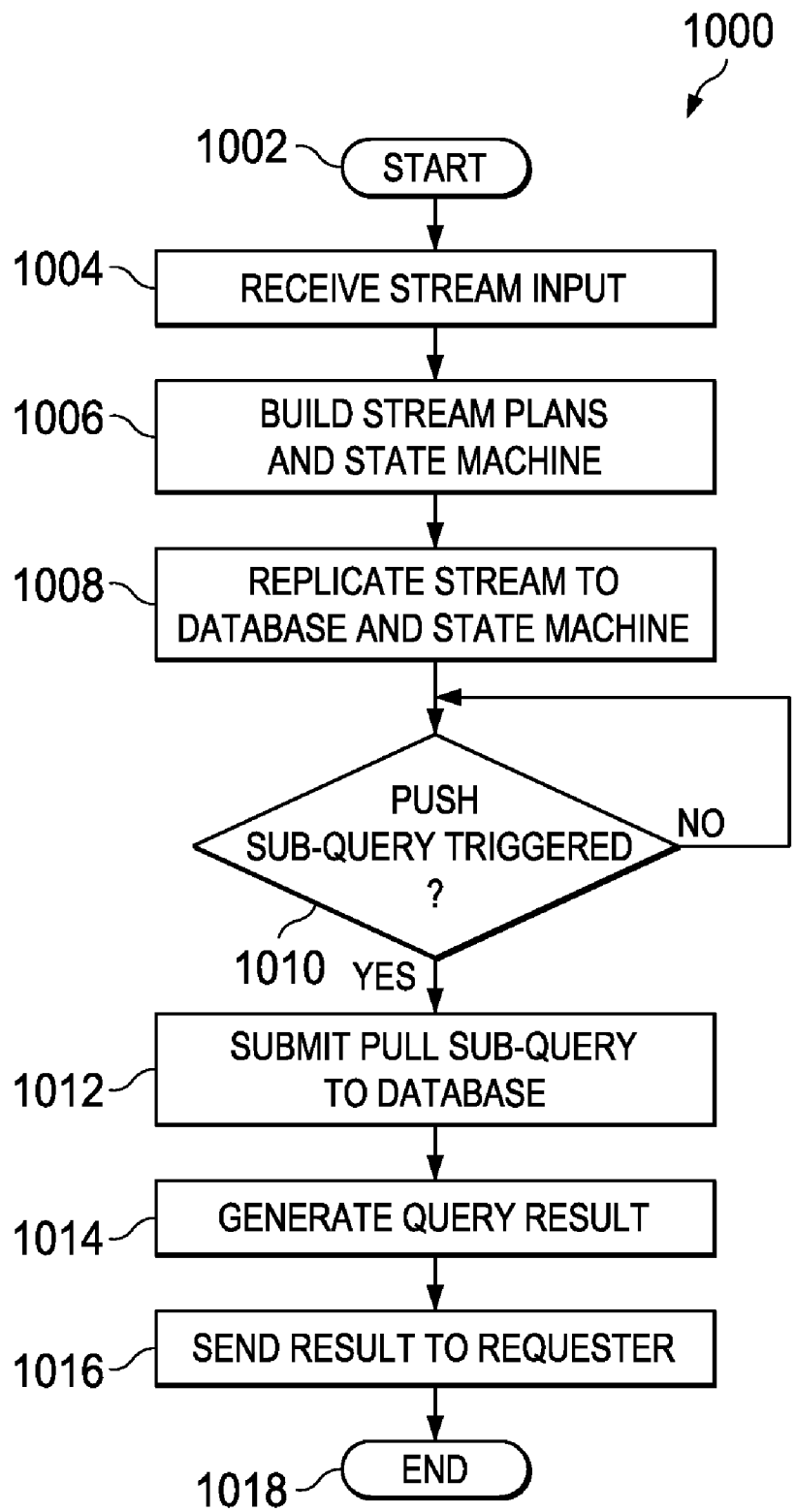
FIG. 10 is a flow diagram of a process using a continuous query, in accordance with illustrative embodiments.

With reference to FIG. 10, a flow diagram of a process using a continuous query, in accordance with illustrative embodiments, is presented. Hybrid query process 1000 is an example of using continuous query manager 300 of FIG. 3.

Hybrid query manager 300 starts, (step 1002) and receives stream input (step 1004). Stream input contains data comprising events of interest. Build stream plans and state machine (step 1006) is performed to create the status monitoring mechanism to track the current state of the push sub-query within hybrid query. The state machine may also be referred to as a stream engine. The stream plans comprise the push sub-query and the pull sub-query required to represent the semantics of the original query.

Replicate stream to database and state machine (step 1008) effectively directs one version of the input stream toward the database management system while an exact copy or replica is directed to the stream engine. The stream engine processes push sub-queries, while the database management system processes pull sub-queries.

A determination is made as to whether a push sub-query triggered (step 1010). A push sub-query trigger occurs when a particular data pattern is detected in the monitoring of the stream. Typically, the detection of the push sub-query is a signal for pull sub-query processing to be invoked. The push sub-query may be based on partial patterns as a quick estimate of a desired condition. When a determination is made that no push sub-query triggered, a "no" result is obtained in step 1010. When a determination is made that push sub-query triggered occurred, a "yes" result is obtained in step 1010.

When a "no" is obtained in step 1010, process 1000 loops back to step 1010. When a "yes" result is obtained in step 1010, submit pull sub-query to database occurs (step 1012). The query is executed to generate query result (step 1014). Send result to requester then sends the query result of step 1014 to the requester (step 1016) with process 1000 terminating thereafter (step 1018).

Thus, illustrative embodiments provide examples of a continuous query manager that provides a capability to effectively monitor an input stream for a desired event. Illustrative embodiments provide a process for building push and pull sub-queries from an original query that may be combined to provide a semantic equivalent of the original query. The push sub-query may then be used to effectively trigger the pull sub-query against a database. Use of the push sub-query typically reduces the need to query the database, thereby reducing the load on the database while allowing the hybrid query to provide similar results of the original query.

The flowchart and block diagrams in the figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for hybrid push/pull of continuous structured query language queries, the computer-implemented method comprising:
   receiving stream input, wherein the stream input comprises events of interest;
   building stream plans based on an original query from the stream input and a state machine, wherein building stream plans comprises splitting the original query into a push sub-query and a pull sub-query, and wherein the pull sub-query represents a portion of the original query from the stream input and the push sub-query represents a remaining portion of the original query from the stream input;
   replicating the stream input, wherein replicating the stream input comprises copying the stream input to produce a set of input streams, wherein one of the set of input streams is directed to a database and one of the set of input streams is directed to the state machine;
   responsive to a push sub-query trigger, determining whether a pattern of the push sub-query matches an event in the one of the set of input streams directed to the state machine to form a pattern match and creating the push sub-query trigger in response to the pattern match, wherein the pattern match causes submitting of the pull sub-query to execute against accumulated data in the database to produce a result; and
   sending the result to a requestor.

2. The computer-implemented method of claim 1, wherein building stream plans further comprises:
   creating a set of pull sub-queries, representing a portion of the original query; and
   combining the push sub-query and the set of pull sub-queries to create a hybrid push/pull query, wherein the hybrid push/pull query is semantically equivalent to the original query.

3. The computer-implemented method of claim 1, wherein submitting a pull sub-query to the database to produce a result further comprises:
submitting a set of pull sub-queries.

4. The computer-implemented method of claim 1, wherein building stream plans based on an original query further comprises:
decomposing the original query according to selectivities, wherein each of the selectivities represents a percentage of events in the stream input that satisfies a condition; and
evaluating costs of stream plans according to the selectivities.

5. The computer-implemented method of claim 1, wherein the original query is a continuous query.

6. A data processing system for hybrid push/pull of continuous structured query language queries, the data processing system comprising:
a bus;
a memory connected to the bus, wherein the memory comprises computer executable instructions;
a communication unit connected to the bus; a database connected to the bus;
a processor unit connected to the bus, wherein the processor unit executes the computer executable instructions to direct the data processing system to:
receive stream input, wherein the stream input comprises events of interest;
build stream plans based on an original query from the stream input and a state machine, wherein building stream plans comprises splitting the original query into a push sub-query and a pull sub-query, and wherein the pull sub-query represents a portion of the original query from the stream input and the push sub-query represents a remaining portion of the original query from the stream input;
replicate the stream input, wherein replicating the stream input comprises copying the stream input to produce a set of input streams, wherein one of the set of input streams is directed to a database and one of the set of input streams is directed to the state machine;
responsive to a push sub-query trigger, determine whether a pattern of the push sub-query matches an event in the one of the set of input streams directed to the state machine to form a pattern match and create the push sub-query trigger in response to the pattern match, wherein the pattern match causes submit of the pull sub-query to execute against accumulated data in the database to produce a result; and
send the result to a requestor.

7. The data processing system of claim 6, wherein executing the computer executable instructions to direct the data processing system to build stream plans further comprises executing the computer executable instructions to direct the data processing system to:
create a set of pull sub-queries, representing a portion of the original query; and
combine the push sub-query and the set of pull sub-queries to create a hybrid push/pull query, wherein the hybrid push/pull query is semantically equivalent to the original query.

8. The data processing system of claim 6, wherein executing the computer executable instructions to direct the data processing system to submit a pull sub-query to the database to produce a result further comprises executing the computer executable instructions to direct the data processing system to: submit a set of pull sub-queries.

9. The data processing system of claim 6, wherein executing the computer executable instructions to direct the data processing system to build stream plans based on an original query further comprises executing the computer executable instructions to direct the data processing system to:
decompose the original query according to selectivities, wherein each of the selectivities represents a percentage of events in the stream input that satisfies a condition; and
evaluate costs of stream plans according to the selectivities.

10. The data processing system of claim 6, wherein the original query is a continuous query.

11. A computer-program product for hybrid push/pull of continuous structured query language queries, the computer program product comprising:
a computer usable storage device, comprising a memory, having computer executable instructions stored thereon, the computer executable instructions comprising:
computer executable instructions for receiving stream input, wherein the stream input comprises events of interest;
computer executable instructions for building stream plans based on an original query from the stream input and a state machine, wherein building stream plans comprises splitting the original query into a push sub-query and a pull sub-query, and wherein the pull sub- query represents a portion of the original query from the stream input and the push sub-query represents a remaining portion of the original query from the stream input;
computer executable instructions for replicating the stream input, wherein replicating the stream input comprises copying the stream input to produce a set of input streams, wherein one of the set of input streams is directed to a database and one of the set of input streams is directed to the state machine;
computer executable instructions, responsive to a push sub-query trigger, for determining whether a pattern of the push sub-query matches an event in the one of the set of input streams directed to the state machine to form a pattern match and creating the push sub-query trigger in response to the pattern match, wherein the pattern match causes submitting of the pull sub-query to execute against accumulated data in the database to produce a result; and
computer executable instructions for sending the result to a requestor.

12. The computer program product of claim 11, wherein computer executable instructions for building stream plans further comprises:
computer executable instructions for creating a set of pull sub-queries, representing a portion of the original query; and
computer executable instructions for combining the push sub-query and the set of pull sub-queries to create a hybrid push/pull query, wherein the hybrid push/pull query is semantically equivalent to the original query.

13. The computer program product of claim 11, wherein computer executable instructions for submitting a pull sub-query to the database to produce a result further comprises:
computer executable instructions for submitting a set of pull sub-queries.

14. The computer program product of claim 11, wherein computer executable instructions for building stream plans based on an original query further comprises:
computer executable instructions for decomposing the original query according to selectivities, wherein the original query is a continuous query, and wherein each of the selectivities represents a percentage of events in the stream input that satisfies a condition; and
computer executable instructions for evaluating costs of stream plans according to the selectivities.

* * * * *